Dec. 15, 1964  E. P. BECKWITH  3,161,169

TORPEDO STEERING CONTROL UNIT

Filed Dec. 10, 1962  2 Sheets-Sheet 1

INVENTOR.
EDWARD P. BECKWITH
BY
*V. C. Muller*
ATTORNEY.

Dec. 15, 1964  E. P. BECKWITH  3,161,169
TORPEDO STEERING CONTROL UNIT
Filed Dec. 10, 1962  2 Sheets-Sheet 2
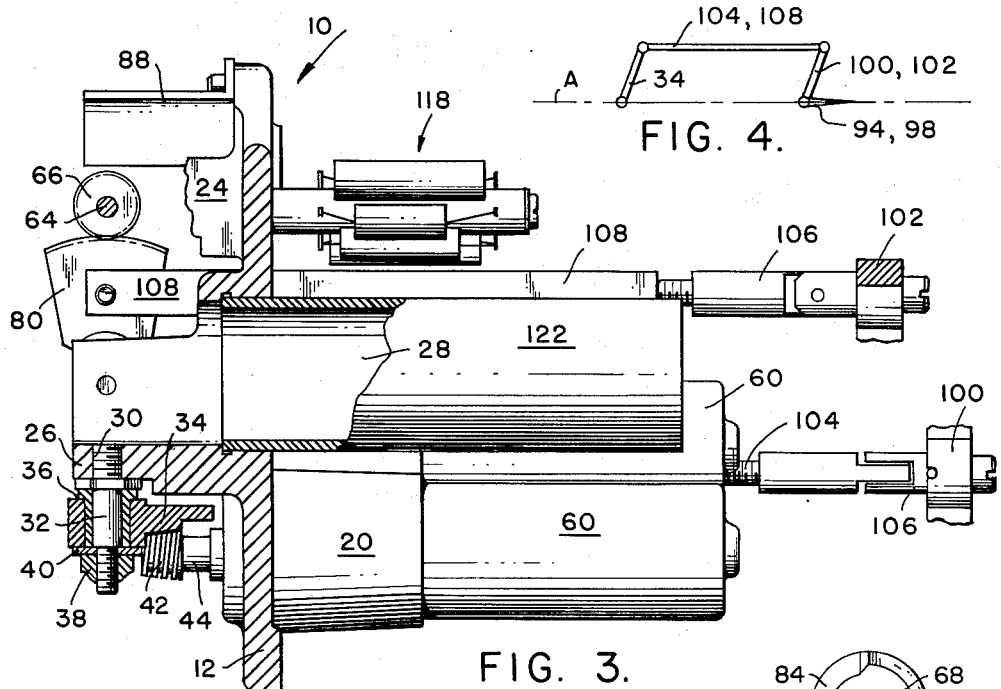
FIG. 4.
FIG. 3.
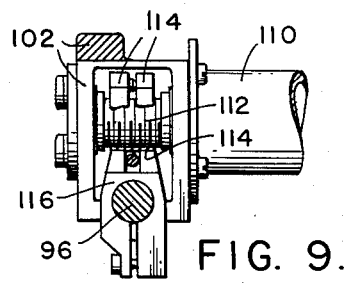
FIG. 9.
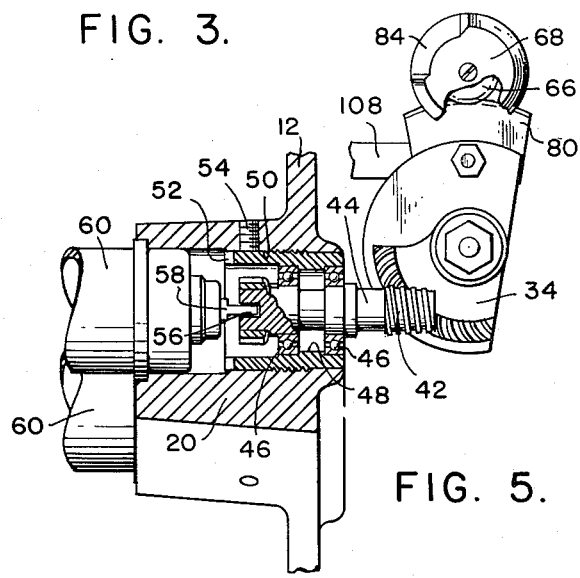
FIG. 5.
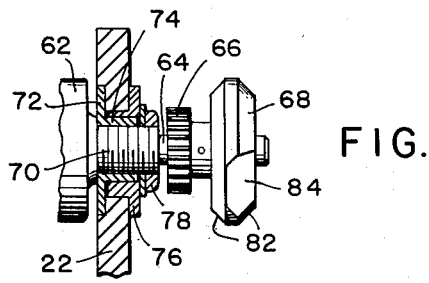
FIG. 6.
INVENTOR.
EDWARD P. BECKWITH
BY
ATTORNEY.

United States Patent Office 3,161,169
Patented Dec. 15, 1964

3,161,169
TORPEDO STEERING CONTROL UNIT
Edward P. Beckwith, Adams, Mass., assignor, by mesne assignments, to the United States of America as represented by the Secretary of the Navy
Filed Dec. 10, 1962, Ser. No. 243,684
6 Claims. (Cl. 114—23)

This invention relates to torpedoes and more particularly to a steering control unit for actuating their azimuthal and elevational rudders.

Among the objects of the invention are the provision of a complete steering unit which requires a minimum of space within a torpedo, is rugged of construction, provided with adjustments for minimizing lost motion, economical of manufacture, and which may be bench tested and adjusted as an interchangeable unit prior to insertion within a torpedo hull.

Other objects, advantages and salient features will become more apparent from a consideration of the description to follow, the appended claims and the accompanying drawing, in which:

FIG. 3 is a section taken on line 3—3, FIG. 2, portions being shown in side elevation;

FIG. 4 is a diagrammatic linkage;

FIG. 5 is a section taken on line 5—5, FIG. 2;

FIG. 6 is a section taken on line 6—6, FIG. 2;

FIG. 9 is a section taken on line 9—9, FIG. 7.

Figure 1:
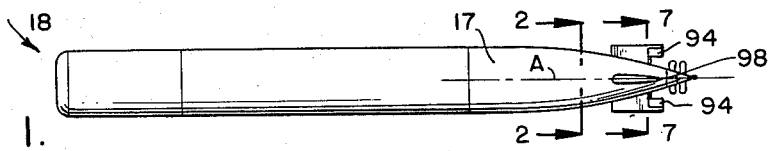
FIG. 1 is a side elevation of a torpedo employing the subject of the invention.
Figure 2:
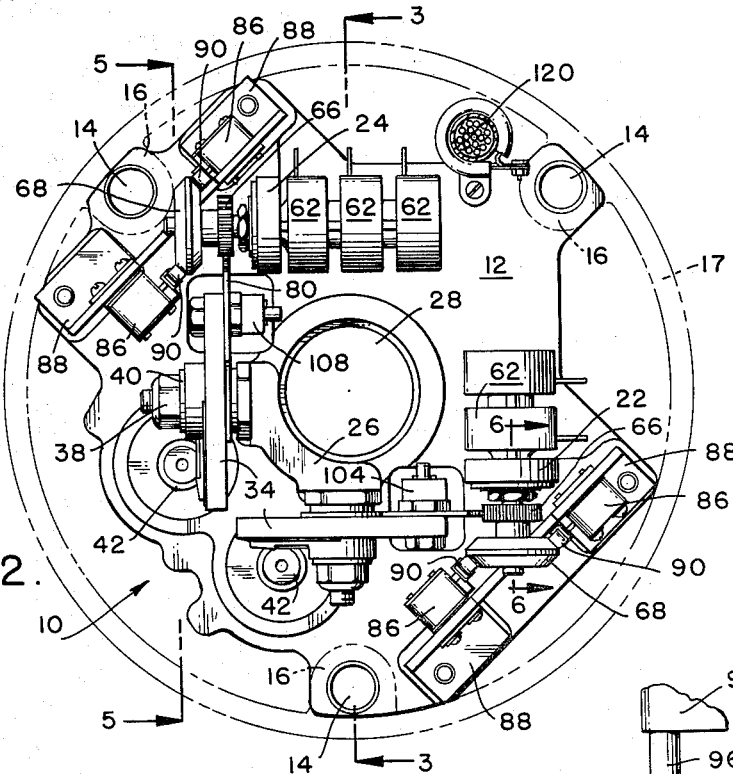
FIG. 2 is an enlarged section taken on line 2—2, FIG. 1.

Referring in detail to the drawing, the subject of the invention comprises a unitary cast frame member 10 having a plate-like portion 12 with apertures 14 receiving attachment bolts for securing it to bosses 16 on the tail cone 17 of a torpedo 18. An integrally cast rearwardly extending boss 20 provides support for a pair of electric motors to be subsequently described and forwardly projecting integrally cast bosses 22, 24, 26 provide supports for other elements also to be subsequently described. A central aperture 28 is provided through which a pair of concentric propeller drive shafts extend (not shown).

Boss 26 is provided with a pair of tapped apertures 30, 30 disposed 90° to each other in the same plane, each of which receives a shouldered stud 32 which rotatably carries a segmental gear 34, provided with a shouldered bushing 36. One or more shims (not shown) may be provided between shoulder 36 and boss 26 to adjust the radial position of the teeth on the gear, as will be more fully described subsequently, and a nut 38 and washer 40 prevent outward radial movement of the gear. A worm gear 42 is integrally formed on shaft 44 and is supported for rotation by a pair of ball bearings 46, 46 which are disposed within machined bores of a sleeve 48 which threadedly engages a machined bore 50 within boss 20. Spanner notches 52 are provided in the rear face of the sleeve for rotating it and moving it axially and one or more set screws 54 are provided for locking it in a desired position. The rear end of the shaft is provided with a slot 56 which snugly receives the flattened end of a shaft 58 driven by a reversible electric motor 60 secured to boss 20. The other segmental gear, worm, its mounting, and motor are identical.

The type of gear teeth employed are of the spiroid type, the worm being frusto conical and meshing with mating teeth on the segmental gear with the axis of the worm disposed in non-intersecting relation to the axis of the segmental gear. By choice of the shims previously referred to the segmental gear may be moved axially toward or from the worm gear and by rotation of sleeve 48 the worm gear may be moved axially to vary gear tooth backlash. Preferably, the worm should be disposed in a substantially fixed or reference position, hence a coarse adjustment is first made by the shims and the worm moved axially (fine adjustment) in one direction or the other away from the reference position. The gears can thus be adjusted so that their teeth properly mesh, yet without backlash.

Each of the bosses 22, 24 support a plurality of stacked potentiometers 62 operated by a shaft 64, to one end of which is affixed a spur pinion gear 66 having an integral cam 68. As best shown in FIG. 6, potentiometer 62 is provided with a hub 70 which threadedly engages a flanged bushing 72, the hub portion 74 of which is disposed within the bore of an eccentric bushing 76, the flange portion of the latter being accessible for rotating it to a desired position. A nut 78, which engages the potentiometer hub may be tightened to thus secure the potentiometer assembly in a desired position. As will be apparent, the eccentric bushing provides an adjustment for moving shaft 64 in a direction toward or away from the axis of rotation of gear 34. A segmental spur gear plate 80 is secured to one face of gear 34 and meshes with pinion 66 and by suitable adjustment of the eccentric bushing, backlash between the pinion and segmental gear plate may be eliminated.

Cam 68 is provided with a pair of frusto-conical surfaces 82, each of which is provided with a depression 84. Micro switches 86, secured to angle brackets 88 are provided with roller switch actuators 90 which engage one of the frusto-conical surfaces. During the portion of rotation of cam 68 in which a frusto-conical surface is in engagement with a roller the switch remains in closed circuit with an actuating motor but when the roller moves into a depression under urge of its resilient actuator the switch is opened thus opening the circuit to a motor. The depressions on the cam are so arranged to open the motor circuit at predetermined angular positions of a rudder away from its central or null position, thus providing limit stops.

Figure 7:
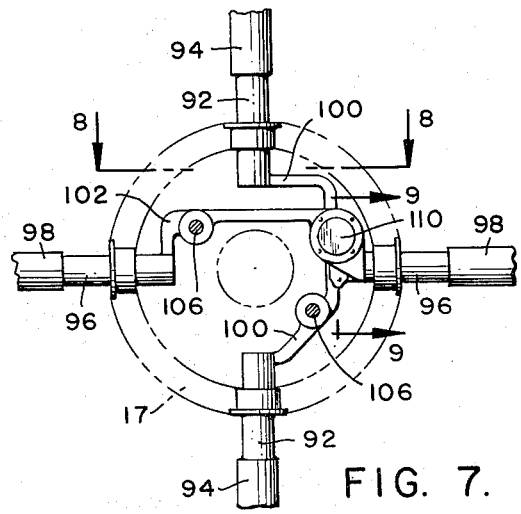
FIG. 7 is a section taken on line 7—7, FIG. 1.
Figure 8:
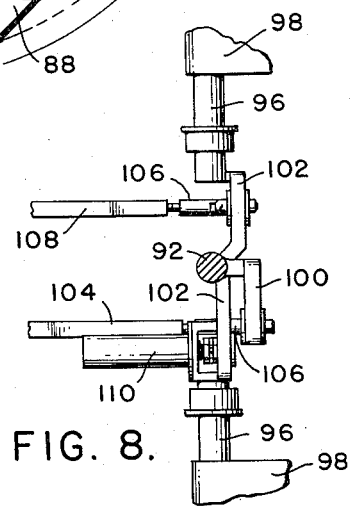
FIG. 8 is a section taken on line 8—8, FIG. 7.

As best shown in FIG. 7, a pair of aligned rudder shafts 92 are provided in the tail cone, each carrying a rudder 94 which steer the torpedo in azimuth. A like pair of rudder shafts 96, each carrying a rudder 98, steer the torpedo in elevation. The azimuth rudders 94 are connected for joint rotation by a yoke 100 and the elevational rudders are similarly connected by a yoke 102. Yoke 100 is operatively connected to one of segmental gears 34 by a link 104, the forward end of which pivotally connects with a segmental gear, and the rearward end of which is provided with a clevis 106 which is connected to yoke 100. Yoke 102 is connected in like manner to the other segmental gear 34 by a link 108. Yoke 102 carries a reversible electric motor 110, having a threaded shaft 112 (FIG. 9) which engages a threaded block 114 pivotally engaging a slotted arm secured to the port elevator shaft, and, by rotation of the motor, the elevational rudders may be disposed at slight angular relationship to produce a roll force about the axis of the torpedo which will balance the roll forces produced by slight unbalance of torpedo propeller torque and other roll forces produced by hydrodynamic forces, such as those produced during change of azimuthal course of the torpedo. Suitable mercury limit switches (not shown) which respond to roll of the torpedo beyond a predetermined angle energize the motor in the proper direction of rotation to position the elevational rudders in such relative position to maintain the axis of the azimuthal rudders in substantially vertical position. The roll correction is normally made only during the search phase of the torpedo and is rendered inoperative during the attack phase. The linkage system between the segmental gears and their respective yokes is of the parallelogram type, and, as will be apparent from FIG. 4, equal angular movement of a gear 34 to one side or the other of rudder null position will move a pair of rudders equal angular distances. Since a potentiometer shaft is gear connected to a segmental gear 34 it rotates in direct proportion to the latter. By suitable choice of resistance windings in the potentiometer, the latter may produce electrical signals which are in direct proportion to angular movement of a pair of rudders away from null position.

Frame 10 also supports various electrical components 118 such as resistors, condensers, etc. which are employed in the potentiometer, micro switch, and motor circuits and a flexible multiple lead electrical conductor 120, provided with a multiple jack (not shown), electrically connects the control unit with circuits in the guidance control system (not shown). Tube 122 which extends rearwardly from frame 10 provides a guide for inserting the propeller shafts from the rear of the torpedo and prevents damage to the control unit which might otherwise occur from misaligned insertion of the propeller shafts.

Obviously many modifications and variations of the present invention are possible in the light of the above teachings. It is therefore to be understood that within the scope of the appended claims the invention may be practiced otherwise than as specifically described.

What is claimed is:

1. Unitary steering actuator apparatus for rotating aligned pairs of rudder shafts of a torpedo which are disposed perpendicular to each other, which apparatus may be bench tested as a unit outside of the torpedo and thereafter bodily inserted into and secured to the tail cone of the torpedo, comprising;
   (a) a frame member, having means for detachably securing it to the tail cone and forming its sole support within the tail cone,
   (b) said frame member having a central aperture through which a torpedo propeller drive shaft may extend,
   (c) a pair of segmental gears supported by said frame member for rotation about perpendicular axes and parallel with the rudder shaft axes,
   (d) a pair of reversible electric motors supported by said frame members having driving shafts disposed parallel with the torpedo axis, each shaft having a worm gear meshing with a segmental gear and adapted to lock a segmental gear from rotation when the worm gear is stationary,
   (e) a link pivotally connected to each segmental gear and extending rearwardly, its rear end adapted to be pivotally connected to one of the pairs of rudder shafts, and
   (f) a rotatable gear driven potentiometer carried by the frame member for each of said segmental gears for indicating the angular position of each pair of rudder shafts.

2. Apparatus in accordance with claim 1 including a reversible electric motor operatively connected to one of the rudder shafts of a pair for moving it angularly with respect to the other rudder shaft of said pair to produce a compensating torque about the axis of the torpedo.

3. Apparatus in accordance with claim 2 wherein said electric motor is carried by a yoke connecting the rudder shafts of said pair.

4. In a torpedo,
   (a) steering actuator apparatus for rotating aligned pairs of rudder shafts, the axes of which are disposed perpendicular to each other and which intersect the longitudinal axis of the torpedo and its propeller drive shaft, said apparatus comprising;
   (b) a frame member adapted to be secured within the tail cone of the torpedo and having a central aperture through which a torpedo propeller drive shaft may extend,
   (c) a pair of spiroid segmental gears supported by said frame member for rotation about perpendicular axes and parallel with the rudder shaft axes,
   (d) a pair of reversible electric motors supported by said frame member having driving shafts disposed parallel with the torpedo axis, each shaft having a spiroid worm gear meshing with a spiroid segmental gear,
   (e) means for adjusting the depth of mesh of each spiroid worm gear with its driven spiroid segmental gear to eliminate backlash,
   (f) a segmental spur gear affixed to each spiroid segmental gear,
   (g) rotatable potentiometers supported by said frame member having spur pinions meshing with each of said segmental spur gears,
   (h) means for adjusting the depth of mesh of each spur pinion with its driving segmental spur gear to eliminate backlash,
   (i) a cam secured to each potentiometer spur pinion and operatively engaging a pair of switches, the cam and switches being so constructed to open the switches at predetermined positions and discontinue operation of a driving motor, and
   (j) a link connecting each spiroid segmental gear with a pair of rudders, said link forming one of the links of a parallelogram linkage.

5. Apparatus in accordance with claim 4 wherein said means for adjusting the depth of mesh of each spiroid worm gear with its driven spiroid segmental gear comprises an axially adjustable sleeve rotatably carrying a worm gear.

6. Apparatus in accordance with claim 4 wherein said means for adjusting the depth of mesh of each spur pinion with its driving segmental spur gear comprises an eccentric bushing supporting a potentiometer which may be rotated to move a potentiometer and its driving pinion in a directon to or from its driving segmental spur gear.

References Cited by the Examiner
UNITED STATES PATENTS

| | | | |
|---|---|---|---|
| 1,570,543 | 1/26 | Winkley | 114—23 |
| 2,188,834 | 1/40 | Fischel et al. | 244—76 |
| 2,505,961 | 5/50 | Hansen et al. | 244—77 |
| 2,974,620 | 3/61 | Malick et al. | 114—23 |

BENJAMIN A. BORCHELT, *Primary Examiner.*

SAMUEL FEINBERG, *Examiner.*